Reissued May 27, 1952

Re. 23,507

UNITED STATES PATENT OFFICE 23,507

METHOD FOR PRODUCING AND REFINING ETHYL ALCOHOL

Russel L. Maycock, Oakland, and Clarence L. Dunn, Berkeley, Calif., assignors to Shell Development Company, San Francisco, Calif., a corporation of Delaware No Drawing. Original No. 2,575,556, dated November 20, 1951, Serial No. 775,740, September 23, 1947. Application for reissue January 11, 1952, Serial No. 266,077

3 Claims. (Cl. 260—641)

Matter enclosed in heavy brackets [ ] appears in the original patent but forms no part of this reissue specification; matter printed in italics indicates the additions made by reissue.

This invention relates to a process for producing ethyl alcohol of high quality, and it is particularly directed to an improved method for refining crude solutions of ethyl alcohol.

Ethyl alcohol, or ethanol, has long been regarded as an important material, and its position in the chemical field is ever becoming more significant. However, emphasis is increasingly being placed on product quality, and even for industrial usages the demand is for a product of high purity with a true, unadulterated odor.

Many processes for manufacturing ethanol have been proposed. Some derive the alcohol by the partial oxidation of various hydrocarbons. Another important method is that whereby ethanol is produced by direct hydration of ethylene, the usual practice being to pass a gaseous mixture of ethylene and steam into intimate contact with a catalyst at elevated temperature and pressure. In the great majority of these methods a relatively dilute solution of ethyl alcohol is produced which contains a number of difficultly separable impurities such as acetaldehyde, crotonaldehyde, sorbaldehyde and the various butyric and caproic aldehydes and alcohols.

The ethanol may in large part be separated from such solutions through the practice of careful fractional distillation procedures, though this method of separation seldom yields a product capable of meeting even industrial standards and never produces alcohol of spirit grade. The impurities which industry finds most objectionable are those of readily oxidizable nature such as aldehydes, and since such impurities are capable of reducing permanganate solutions, it is conventional to specify that the alcohol shall have a stated minimum permanganate time, normally 30 minutes. This time is determined by introducing 2 ml. of an 0.02% solution of potassium permanganate into 50 ml. of the alcohol at 15 to 16° C. The time required for the solution to lose its pink permanganate color is regarded as the "permanganate time." As little as 1 part per million of crotonaldehyde or 2 parts per million of sorbaldehyde, for example, in the alcohol will cause a drop in permanganate time from 60 minutes to less than 30 minutes. Accordingly, it is easy to understand why distillation alone is normally ineffective to produce a product of the desired quality. In fact, the prolonged heating attendant on a careful separation of the ethanol by distillation often increases the content of many of these more undesirable components. The various impurities also impart a foreign odor to the product, thereby lowering its quality and marketability.

A product of improved quality may be obtained by subjecting the fractionally distilled ethanol solution to further purification treatments. These are of various kinds, but one of the most satisfactory is that whereby reducible impurities in the distilled and relatively concentrated ethanol solution are hydrogenated. The latter treatment improves the permanganate time of the alcohol, and by using a hydrogenation catalyst of the most efficient type, an alcohol having a permanganate time of at least 30 minutes may usually be produced. However, the hydrogenation catalysts which have the greatest efficiency are considerably more expensive than are others whose activity is somewhat less, and where economy of operation is a factor, it would be desirable if the cheaper types of catalytic materials could be employed. While hydrogenation serves to increase the permanganate time of the alcohol, the treatment in many instances does not provide a commensurate improvement in product odor. This is true even when catalysts of the highest possible efficiency are utilized.

Another difficulty encountered in refining ethanol-containing solutions is that of corrosion, the effluent streams often corroding metal surfaces so rapidly as to necessitate the frequent replacement of large sections of equipment. While this disadvantage may be overcome to a certain extent by the use of such corrosion resistant metals as copper or silver, the expense of such equipment is very great.

It is therefore an object of the present invention to provide a process for refining the crude product stream of an ethanol manufacturing operation, whereby ethanol of high quality may be obtained at low cost. A further object is to provide a method whereby crude, ethanol-containing solutions may be first fractionated and thereafter hydrogenated with the resultant production of an ethanol solution of high purity and strength, with a long permanganate time and a true, uncontaminated odor, a more particular object being to provide such an ethanol solution while using a hydrogenation catalyst of the relatively less efficient and inexpensive type.

Another object is to provide a method of refining crude ethanol-containing effluents whereby corrosion of metal surfaces coming into contact therewith is either entirely eliminated or reduced to negligible proportions.

A still further object is to provide a method whereby the foregoing objects may be achieved in the treatment of crude, ethanol-containing effluent streams derived from the hydration of ethylene.

Still other objects of the present invention will appear from the nature of the description to follow.

It has been discovered that by so controlling the crude, ethanol-containing effluent streams to be refined that a pH of from 6 to 9, and preferably of from 6.5 to 7.5, will be established in the liquid obtained on condensing said effluent, a product is obtained which can be fractionally distilled and hydrogenated with the resultant production of an ethanol solution of high strength and purity, with a true, unadulterated odor and a long permanganate time, and which does not corrode the metallic surfaces with which it comes in contact. The establishment of such a pH requires that an alkaline material be added to effluents which are strongly acid in character, while an acid material must be added to those having a pH which is higher than 9. When a crude, ethanol solution of the kind here described is refined, the amount of the various impurities, such as crotonaldehyde and sorbaldehyde, formed is kept at a low level, and it becomes possible to effect hydrogenation over a catalyst of the less efficient type, as one containing from 5 to 15% nickel, and this without lowering the quality of the final ethanol product. While it may be necessary to fractionally distil the hydrogenated product one or more times in order to obtain an alcohol having a permanganate time of 30 minutes or more, this is a relatively unimportant feature and represents a practice which it is conventional to employ no matter what the nature of the previously used hydrogenation catalyst. Further, treatment of the gaseous effluent so as to provide a condensate having a pH in the range of 6 to 9, insofar as it reduces the amounts of impurities formed during subsequent processing steps, materially improves the odor of the final product even when hydrogenation is carried out in the most efficient manner and is followed by one or more fractional distillation steps. Still another advantage accruing from controlling the pH in the manner described above is that corrosion of the equipment employed in the various refining steps is substantially eliminated, and it no longer becomes necessary to fabricate the equipment of the more corrosion resistant metals.

While the process of this invention may be practiced with equally good results in the treatment of crude, ethanol-containing products resulting from any of the available manufacturing processes, it finds particular utility in treating the crude effluent obtained in the direct hydration of ethylene. Accordingly, the invention will now be described as it relates to the said hydration process, though without limitation thereto.

While a number of alternative procedures exist by which ethylene may be converted into ethanol by direct hydration, all involve bringing ethylene and water together in the presence of a catalyst, usually at elevated temperature and pressure. Various hydration catalysts have been proposed for use in this reaction, some of them being acid in character, as phosphoric acid, sulfuric acid, or boron phosphate, while others are of the alkaline type, as sodium or potassium hydroxide. The reaction may be brought about by passing ethylene, or a mixture of ethylene and steam, through a solution of the catalyst, or it may be carried on by bringing the said reactants into intimate contact with a catalyst absorbed on a porous, solid support, as any one of various silicas, aluminas, or calcined diatomaceous earth materials. In any case, a crude, ethanol-containing effluent is obtained which may be condensed to provide a solution containing anywhere from 5% to as much as 20% or more of ethanol.

The great majority of these crude, ethanol-containing streams, whether gaseous or liquid in character, are corrosive to metal equipment surfaces with which they may come in contact. Further, the conditions prevailing in the streams often favor the formation of impurities of an undesirable nature, particularly the higher unsaturated aldehydes such as crotonaldehyde and sorbaldehyde. These impurities are formed both during the step whereby the crude gaseous effluent stream is condensed to liquid form, as well as during the prolonged heating period incident to effective fractional distillation. We have found that by so controlling the gaseous effluent from an ethylene hydration reactor so as to establish a pH of from 6 to 9, and preferably of 6.5 to 7.5, in the aqueous solution of ethanol obtained on condensing the effluent, and by thereafter subjecting the condensate of established pH to fractional distillation and hydrogenation treatments, a concentrated ethanol solution of good quality may be obtained even though hydrogenation be carried on with the aid of catalysts of the less efficient type, as discussed above. A practice of this method greatly reduces the amount of various impurities, and of crotonaldehyde and sorbaldehyde in particular, formed during the step of condensing the gaseous effluent and that of fractionally distilling the resulting condensate, and in many cases the formation of these impurities will be prevented altogether. Further, once the acid character of the effluent stream has been destroyed, it becomes possible to employ the conventional steel equipment without danger of corroding the same.

In order to obtain a condensate having a pH within the range of 6 to 9, we preferably direct a spray of the desired acid or alkaline additive solution into the gaseous effluent, the spray, in turn, being preferably introduced into the effluent after the latter has been cooled to a temperature but slightly above its dew point. Steel equipment is particularly subject to corrosion at the point where the spray is admitted, a difficulty which may be overcome by providing a silver spray tip and a silver lining along the relatively short portion of the conduit where admixture of the gaseous effluent with the spray occurs. If for any reason a condensate of the desired pH is not obtained, the necessary adjustment may be made before the solution is subjected to the subsequent fractional distillation step.

If desired, no acid or alkaline material need be added to the crude, gaseous, effluent stream, in which case the said materials are added to the condensate in amounts sufficient to provide therein a pH of from 6 to 9. This practice has the disadvantage that some impurity formation may take place during the condensation step; further, it will also be necessary to protect the condenser walls against the corrosive action of the entrant gases, all of which is unnecessary when the desired additive materials are sprayed directly into the gaseous effluent.

In those cases where hydration of the ethylene is effected over an acid catalyst, as phosphoric acid or sulfuric acid, for example, the condensate obtained from the resulting gaseous effluent will be strongly acid in character, a pH value therein of from about 2.5 to 4.5 being common. Effluents of this type may be treated by adding either acqueous or alcoholic solutions of an alkaline material, as the various alkali metal or alkaline earth metal, hydroxides and carbonates, though of this group of salts we prefer to use either sodium hydroxide or potassium hydroxide, or a mixture of the two. The term "alkaline material" is also intended to embrace the various phosphate acid salts. Mixtures of disodium hydrogen phosphate and dihydrogen sodium phosphate, for example, are capable of establishing pH's ranging from 5.3 to 8 in aqueous solutions, and much the same may also be said of the potassium acid phosphates and those of the other alkali metals. In those cases where an alkaline hydration catalyst is employed, the resulting condensate will normally have a pH of 10 or above, and here the pH is downwardly adjusted by adding an acidic material, as phosphoric, or other mineral acid, or by adding a buffer solution of the type described above. The said buffering agents, therefore, also fall within the term "acid material," as that term is employed herein.

Mention has been made above of-hydrogenation catalysts of one type or another, and while many materials have been proposed for this purpose, those which find the widest acceptance in procedures such as that here encountered incorporate nickel as their active ingredient. Nickel catalysts fall into two general groups, the first comprising the somewhat less efficient and greatly less expensive catalysts containing from about 5% to 15% nickel, and the second group comprising the more active catalysts containing at least 60% nickel. Th catalysts in the first group are normally prepared by absorbing a solution of a nickel salt, as nickel nitrate hexahydrate, on a solid, porous support (calcined diatomaceous earth or majolica, for example) and thereafter drying the material and reducing the salt. The catalysts in the second group may be prepared by precipitating nickel carbonate on diatomaceous earth and thereafter calcining the product and reducing the nickel oxide to metallic nickel. Such methods of catalyst preparation are well known and form no part of the present invention.

Even should conditions within a given effluent from an ethylene hydration reaction particularly favor the formation of the higher unsaturated aldehydes, as crotonaldehyde and sorbaldehyde, by practicing this invention the level of each of such impurities in the initially obtained distillate may be kept below 0.01%, and as long as the impurity levels do not rise above this figure, the less efficient types of hydrogenation catalysts are effective in reducing the amounts of impurities that products of good permanganate time and true odor may be obtained. However, as the content of either sorbaldehyde or crotonaldehyde rises above 0.01%, resort must be had to the more efficient hydrogenation catalysts, and while the resulting products will manifest a satisfactory permanganate time, particularly after one or more post-hydrogenation fractional distillation treatments, the odor of the final product will not be as good as that which might have been obtained had the conditions within the crude effluent been originally controlled so as to provide a condensate of pH 6 to 9, and the impurity content so kept below 0.01% for each compound.

The following examples illustrate the manner in which the present invention finds application:

EXAMPLE I

A gaseous mixture of ethylene and water vapor was passed over a bed of solid catalyst having a volume of ½ cubic feet and containing absorbed phosphoric acid, said mixture having a water vapor-ethylene molar ratio of 0.6 and being passed through said bed at the rate of 15 cubic feet per minute, as measured under normal conditions. The catalyst bed was maintained at a temperature between 295° C. and 300° C., and the total system pressure was 900 p. s. i., absolute. The resulting ethanol-containing effluent had a pH of 4.5. This effluent was passed through a pre-cooling device where the temperature was reduced to 210° C. On leaving the pre-cooler the gaseous effluent was sprayed with a 1.5% solution of sodium hydroxide at the rate of 240 ml. per hour. The sodium hydroxide-containing effluent was then passed into a condenser which effected separation of a liquid condensate having a pH of 7.3. The said condensate contained approximately 16% ethanol, 0.2% acetaldehyde and a trace of crotonaldehyde (probably less than 0.0005%). The uncondensed gases were then recycled to the hydration reactor and the condensate was subjected to fractional distillation in a distilling column. The alcohol-containing product recovered from the column contained approximately 80% ethanol, 1.1% acetaldehyde and 0.003% crotonaldehyde.

The distillate was now subjected to hydrogenation treatment conducted at a temperature of 100° C. and at a pressure of 35 p. s. i., absolute, hydrogen being introduced into the liquid for a period of about 10 minutes as the liquid was passed over a nickel catalyst of the less active type, containing 8% nickel deposited upon a porous majolica type base. Following hydrogenation the product was again subjected to a fractional distillation treatment, and the final material so obtained contained 92% ethanol. This product had a permanganate time of 43 minutes and its odor was good.

It was also observed that the steel equipment surfaces with which the crude ethanol streams, both gaseous and liquid, came into contact subsequent to the introduction of caustic were substantially free of corrosion even after the process had been kept in continuous operation for a period of several weeks. This visual absence of corrosion was also borne out by analysis of the aqueous stream withdrawn from the bottom of the first fractional distillation column, the said stream containing but 0.5 part per million of iron.

EXAMPLE II

In this operation the same procedure of producing the crude, ethanol-containing effluent was followed as described above in Example I. In this case, however, an excess of caustic was supplied the said effluent, an 8.7% sodium hydroxide solution being sprayed into the gaseous stream at the rate of 190 ml. per hour. Upon condensation of the resulting product, a solution was obtained which had a pH of 11.1, and it contained 16% alcohol, 0.2% acetaldehyde and 0.008% crotonaldehyde. This condensate was now concentrated by fractional distillation and a solution so obtained containing 8[n]% ethanol, 0.04% crotonaldehyde and a trace of sorbaldehyde.

Hydrogenation of the distillate was then effected over the nickel majolica catalyst in the same manner as described in Example I. The resulting product contained between 0.0001% and 0.0002% crotonaldehyde and 0.08% butyraldehyde. Despite repeated fractional distillation of the hydrogenated product it was not possible to obtain an alcohol exhibiting a permanganate time greater than 17 minutes. Further, the said alcohol was characterized by a poor odor.

EXAMPLE III

The procedure in this refining operation followed that outlined above in Example I. Here, however, no caustic was added to the crude, alcohol-containing effluent stream at any time. While the final product exhibited a satisfactory permanganate time, operation of the equipment under the conditions described in this example proved difficult for the effluent stream so corroded the steel conduit members as to cause failure thereof. Analysis of the liquid withdrawn at the bottom of the distilling column into which the crude condensate was first introduced disclosed an iron content of 23 parts per million, this figure contrasting with the value of 0.5 part per million experienced with the addition of a controlled amount of caustic, and clearly evidencing rapid corrosion within the system.

The various percentages expressed herein and in the appended claims refer to weight-per cent unless otherwise indicated.

We claim as our invention:

1. In a method of producing ethanol, the steps comprising reacting gaseous ethylene and water vapor at elevated temperatures and pressures and in the presence of an acid catalyst to produce a crude, ethanol-containing, gaseous effluent strongly acid in character; maintaining said effluent in the gaseous state *while* spraying said effluent with a solution of an alkaline material in a quantity sufficient to establish a pH of from 6.5 to about 7.5 in the liquid obtained on condensing the effluent; condensing the effluent; fractionally distilling the condensate to provide a distillate high in ethanol; hydrogenating the distillate in the presence of a nickel hydrogenation catalyst; and fractionally distilling the hydrogenated solution to produce an ethanol fraction having a permanganate time of at least 30 minutes and a true, unadulterated ethanol odor.

2. In a method of producing ethanol, the steps comprising reacting gaseous ethylene and water vapor at elevated temperatures and pressures in the presence of a phosphoric acid catalyst to produce a crude, ethanol-containing, gaseous effluent strongly acid in character; maintaining said effluent in the gaseous state *while* spraying said effluent with a solution of an alkali metal hydroxide in a quantity sufficient to establish a pH of from 6.5 to about 7.5 in the liquid obtained on condensing the effluent; condensing the effluent; fractionally distilling the condensate to provide a distillate high in ethanol; hydrogenating the distillate in the presence of a nickel hydrogenation catalyst; and fractionally distilling the hydrogenated solution to produce an ethanol fraction having a permanganate time of at least 30 minutes and a true, unadulterated, ethanol odor.

3. In a method of producing ethanol, the steps comprising reacting gaseous ethylene and water vapor at elevated temperatures and pressures in the presence of phosphoric acid catalyst to produce a crude, ethanol-containing, gaseous effluent strongly acid in character; maintaining said effluent in the gaseous state *while* spraying said effluent with a phosphate buffer solution in a quantity sufficient to establish a pH of from 6.5 to about 7.5 in the liquid obtained on condensing the effluent; condensing the effluent; fractionally distilling the condensate to provide a distillate high in ethanol; hydrogenating the distillate in the presence of a nickel hydrogenation catalyst; and fractionally distilling the hydrogenated solution to produce an ethanol fraction having a permanganate time of at least 30 minutes and a true, unadulterated, ethanol odor.

RUSSEL L. MAYCOCK.
CLARENCE L. DUNN.

REFERENCES CITED

The following references are of record in the file of this patent or the original patent:

UNITED STATES PATENTS

| Number | Name | Date |
|---|---|---|
| 1,438,123 | McElroy | Dec. 5, 1922 |
| 1,681,238 | James | Aug. 21, 1928 |
| 2,050,445 | Metzger | Aug. 11, 1936 |
| 2,080,111 | Bump | May 11, 1937 |
| 2,276,142 | Atwood | Mar. 10, 1942 |
| 2,302,346 | Pohler | Nov. 17, 1942 |